Patented Nov. 1, 1932

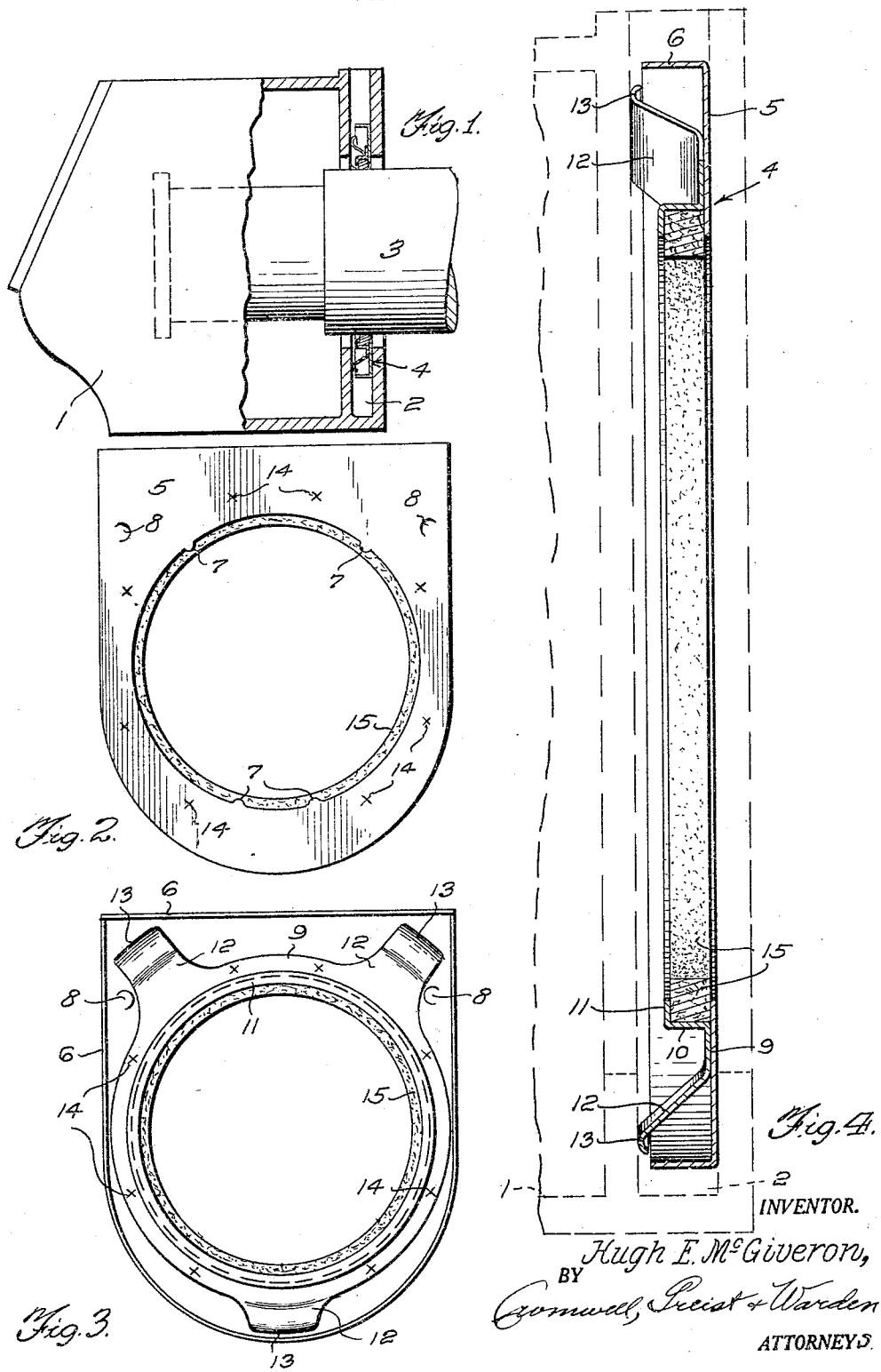

1,886,038

UNITED STATES PATENT OFFICE

HUGH E. McGIVERON, OF HASLETT, MICHIGAN, ASSIGNOR TO MOTOR WHEEL CORPORATION, OF LANSING, MICHIGAN, A CORPORATION OF MICHIGAN

OIL AND DUST GUARD

Application filed January 22, 1931. Serial No. 510,570.

The invention relates to an improved oil and dust guard which, in cooperative relationship with a journal box and a shaft or axle therein, will serve effectually to seal the box against dust and against leakage of lubricant. More particularly, the invention relates to a stamped metal oil and dust guard having special utility in connection with journal boxes and axles of railway rolling stock.

Journal boxes of railway rolling stock are subjected to an atmosphere charged with an unusual amount of dust and dirt, which, if allowed to enter the box and mingle with the lubricant, will prevent effective lubrication and score the journal and bearing.

Many attempts have been made to prevent entrance of dust and escape of lubricant in connection with journal boxes and various means and devices have heretofore been employed for the purpose. One type of guard previously employed involved only a piece of wood apertured to provide passage of the axle but such guards as well as other relatively fixed guard structures are objectionable by reason of abnormal wear occasioned by movement of the axle requiring frequent replacement. Other structures in which provision was made for axle movement usually have been either complicated in structure with an objectionable number of parts, or have involved constructions not particularly durable and not permitting the maximum width of packing or sufficient bearing face area.

The entrance of dust to the journal box from the front is easily guarded against by the closure of the box itself which can be made tightly fitting as there is no relative motion of the box and closure in use, but the problem is to seal the rear of the box against the dust while providing for free turning of the journal within the rear opening in the box. This necessitates an extended surface bearing between plane faces of the dust guard and journal box as distinguished from edge or interrupted contact, as well as continuous contact between the packing ring and journal. To insure a uniform dust-tight bearing between the plane faces of the dust guard and journal box, it is important that the pressure of the same together be uniformly effected, and for this purpose a three-point application of spring pressure is desirable as distinguished from spring pressure so applied as to permit of tilting.

This invention has for its object the production of an improved oil and dust guard unit of stamped metal which can be cheaply manufactured and which will effectually exclude dust and prevent oil leakage, and yet be simple in construction, easy to handle and install, and very durable in service.

A further object of the invention is the production of an oil and dust guard providing a maximum bearing surface area and width of lining to provide a close joint with the axle and journal box.

A further object of the invention is the production of a guard having but two metal parts welded together with integral spring elements so arranged as to give a well balanced and evenly distributed pressure throughout the unit but permitting necessary movement of the unit.

Another object of the invention is the production of a guard unit including a novel packing which will avoid scoring the journal.

Generally, the invention consists of two flanged metal stampings welded together to provide an annular packing recess to receive a suitable filling for engagement with the axle. One of the stampngs is provided with a marginal flange and a flat bearing or wear face for engaging the journal box while the other stamping is positioned within the marginal flanges of the first stamping and has integral spring fingers suitably spaced and proportioned and extending slightly beyond the edges of the marginal flanges for yielding engagement with the journal box to maintain the unit in position.

The invention is described more in detail in the following description and in connection with the drawing forming a part of the specification.

In the drawing, in which like reference numerals have been employed to represent similar parts in the various figures,—

Fig. 1 is a side elevation of journal box and journal therein equipped with the invention, with a portion of the figure in section;

Fig. 2 is a side elevation of the guard unit of the invention showing the extended bearing surface area;

Fig. 3 is a side elevation of the guard unit taken of the side opposite to that shown in Fig. 2; and Fig. 4 is an enlarged vertical cross section of the guard conforming to the showing of the guard in Fig. 1.

Referring to the drawing, 1 indicates a journal box of conventional construction having a well 2 formed therein to serve as a guard receiving pocket to receive the dust guard 4, the walls of the journal box having an opening in the sides to accommodate an axle 3 passing therethrough and engaged by the oil and dust guard.

The dust guard unit 4 comprising the invention is arranged for insertion within the pocket or well 2 in close engagement with the inner rear wall of the well, and consists of a flat centrally apertured stamped steel plate 5 rounded at one end and provided on all sides with marginal upstruck flanges 6 and pointed prongs 7 at the inner edge defined by the aperture for engagement with a filling hereinafter to be described. A cooperating apertured stamped steel plate 9 is provided for positioning between the marginal flanges of the first plate, struck up portions 8 on the first plate being provided to facilitate positioning when the plates are brought into abutting relationship for fastening. The plate 9 is smaller than plate 5 and is dished centrally by the provision of upstanding flange 10 and radially extending flange 11 and the aperture formed by the inner edge of the radially extending flange registering with the aperture in the plate 5 with the flanges 10 and 11 defining an annular recess for receiving a suitable packing. The plate 9 is also provided at spaced sections around its periphery with three outwardly inclined radially extending integral spring tongues 12 having their free ends curved at 13 to present a smooth bearing surface. The outwardly inclined tongues 12 are laterally extended to a plane parallel to but outside of the plane of the free edges of the marginal flanges on the plate 5 to engage an inner wall of the pocket 2 for the purpose of firmly and closely seating the flat bearing face of the plate 5 against the opposite side wall of the pocket. The plates 5 and 9 when positioned as described are firmly united intermediate their outer and inner edges at suitable points by spot welds 14, thus assuring in a simple manner a rigid durable structural unit without extra fastening devices.

The filling or packing 15 is preferably made of a soft woven wire asbestos material and is thoroughly impregnated with graphite, and, in assembled position is placed in the annular space defined by the flanges 10 and 11 and the overlying plate 5, and extends radially well within the aperture formed in the plate to avoid any possible contact of the plates with the journal. The packing is so dimensioned as to provide a close fit with the journal 3 but is securely held against rotation therewith by the prongs 7 on the plate 5 which prongs are bent inwardly to firmly engage in the side of the packing ring.

From the foregoing detailed description of the invention, the manufacturing and structural advantages will be apparent to those skilled in the art. It is desired, however, to set forth specifically the more important advantages of the structure. Structures of the kind must necessarily be rugged and durable and the applicant, by provision of the large flat plate with marginal flanges, provides for an exceptionally large area of contact with the end wall of the journal box casting to seal out the dust and dirt. This feature is a distinct advantage over prior art devices and is fully contributed to by the three integral spring tongues on the cooperating stamping. The springs are so disposed and dimensioned as to give a well balanced and evenly distributed pressure and yet allow for necessary movement of the unit. The nested relationship of the steel stampings with spot welds between their outer and inner edges provide a very durable and practically indestructible unit. A very important feature of the invention is the special packing and the provision for the maximum width for such element made possible by the flat plate and the dished central portion which may be offset to limits defined by the well in the journal box. This packing is firmly held against rotation. The entire unit may be manufactured cheaply, may be easily handled and installed by merely slipping it into place in the journal box pocket.

What I claim is:—

1. In a metal dust guard unit for railway journal boxes, two apertured steel stampings welded together to provide a central annular packing receiving chamber, a packing ring in the chamber, one of said stampings having forwardly extending marginal flanges and a flat rear bearing surface, the other stamping having a plurality of integral outwardly directed spring tongues extending forwardly beyond the free edges of the marginal flanges.

2. In a metal dust guard unit for railway journal boxes, two apertured steel stampings welded together to provide a central annular packing receiving chamber, a packing ring disposed in the chamber, one of said stampings having forwardly extending marginal flanges and spaced integral prongs extending into the aperture, the other stamping having three radially outwardly inclined integral spring tongues extending beyond the plane of the free edges of the marginal flanges, said prongs being adapted to be bent into engagement with the packing ring in the chamber to prevent rotation of the ring.

3. A metal oil and dust guard comprising a flat centrally apertured steel stamping having marginal flanges, a second apertured steel stamping nested within the marginal flanges of the first stamping and dished centrally adjacent the aperture into contact with the first stamping and provided at its periphery with angularly extending integral spring tongues, means for fastening the stampings on their contact area to form a unit defining a central annular chamber for receiving a packing, a woven asbestos packing ring within the chamber extending radially into the aperture, and means integrally formed with one of the stampings adapted to frictionally engage the packing ring to prevent rotation of the ring with respect to the stampings.

4. In a metal dust guard for railway journal boxes having a rear pocket surrounding the axle, two apertured steel stampings welded together and forming a central annular packing receiving chamber, one of said stampings having a flat faced bearing portion and marginal flanges, the other stamping having integral outwardly inclined spring tongues extending beyond the plane of the free edges of the marginal flanges.

5. In a metal dust guard unit for journal boxes, a pair of centrally apertured metal stampings, spot welds connecting said stampings intermediate their outer and inner edges, integral marginal flanges on one of the stampings, outwardly inclined integral spring tongues on the other stamping extending beyond the plane of the free edges of the marginal flanges, the stampings spaced apart adjacent the aperture to form an annular packing chamber between the stampings, a woven lubricant impregnated packing in the chamber and extending radially within the aperture, and means for engaging the packing to prevent rotation.

6. A metal dust guard unit for journal boxes comprising a pair of centrally apertured metal stampings welded together intermediate their outer and inner edges, one of said stampings being substantially flat and having integral marginal flanges, the other stamping having a plurality of integral outwardly inclined radially extending spring tongues and a central annular dished portion and adjacent the central aperture spaced from and defining with the first mentioned stamping an annular chamber, a packing in the annular chamber extending radially inward beyond the edges of the stamping, and integral prongs on one of the stampings adapted to be bent into engagement with the packing.

7. In a metal dust guard for railway journal boxes having a rear pocket surrounding the axle, a pair of front and rear centrally apertured metal stampings, the rear stamping having a plane rear face for extended surface contact with the rear wall of the pocket, the front stamping having a portion contacting and permanently attached to the other, the front stamping adjacent its aperture forwardly and then inwardly flanged to provide an annular packing chamber and at its outer margin provided with spaced spring tongues forwardly extending for bearing engagement with the front wall of the pocket, and a centrally apertured packing ring disposed within the packing chamber.

8. In a metal dust guard for railway journal boxes having a rear pocket surrounding the axle, a pair of front and rear centrally apertured metal stampings, the rear stamping having a plane rear face for extended surface contact with the plane rear wall of the pocket and provided with marginal forwardly extending flanges, the front stamping having a portion contacting and permanently attached by welding to the other, the front stamping adjacent its aperture forwardly and then inwardly flanged to provide an annular packing chamber and at its outer margin provided with three spaced integral spring tongues forwardly extending beyond the plane of the marginal flanges of the rear stamping for bearing engagement with the front wall of the pocket, a centrally apertured packing ring disposed within the packing chamber, and prongs carried by one of the stampings and engaging the packing ring to prevent shifting of the latter within its chamber.

9. In a metal dust guard for railway journal boxes, two apertured steel stampings fixedly secured together to provide a central annular packing-receiving chamber, a packing ring in the chamber, one of said stampings having an extensive flat rear bearing surface, the other stamping having three integral outwardly and forwardly directed spring tongues.

In testimony whereof I have hereunto subscribed my name.

HUGH E. McGIVERON.